(12) United States Patent
Ou-Yang et al.

(10) Patent No.: US 11,009,373 B2
(45) Date of Patent: May 18, 2021

(54) OPTICAL ENCODING DEVICE FOR DIGITAL SIGNAL PROCESSING

(71) Applicant: NATIONAL CHIAO TUNG UNIVERSITY, Hsinchu (TW)

(72) Inventors: Mang Ou-Yang, Hsinchu (TW); Yuan Ouyang, Taoyuan (TW); Tzu Min Chuang, Taichung (TW); Ren-Li Yang, New Taipei (TW); Yung-Jhe Yan, Taipei (TW); Hou Chi Chiang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 113 days.

(21) Appl. No.: 16/539,002

(22) Filed: Aug. 13, 2019

(65) Prior Publication Data

US 2020/0141767 A1    May 7, 2020

(30) Foreign Application Priority Data

Nov. 2, 2018   (TW) .................................. 107139014

(51) Int. Cl.
*G01D 5/347* (2006.01)
(52) U.S. Cl.
CPC ................................. *G01D 5/34715* (2013.01)
(58) Field of Classification Search
CPC ....................... G01D 5/34715; G01D 5/34792
See application file for complete search history.

(56) References Cited

U.S. PATENT DOCUMENTS

| | | | |
|---|---|---|---|
| 5,336,884 A | 8/1994 | Khoshnevisan et al. | |
| 6,564,168 B1 | 5/2003 | Hasser | |
| 2005/0052729 A1* | 3/2005 | Mitamura | G01D 5/34715 |
| | | | 359/337.21 |
| 2018/0299300 A1* | 10/2018 | Kimura | G01D 5/34715 |

OTHER PUBLICATIONS

Matsuzoe, et al. "High-performance absolute rotary encoder using multitrack and M-code." Opt. Eng. vol. 42, No. 1 (Jan. 2003), pp. 124-131.

* cited by examiner

*Primary Examiner* — Jennifer D Bennett
(74) *Attorney, Agent, or Firm* — Rosenberg, Klein & Lee

(57) ABSTRACT

An optical encoding device includes a code disc, an optical signal generator, (K+1) optical sensors and an encoding circuit. The code disk has K gratings arranged in a row. The total width of the optical sensors is equal to the total width W of the gratings. The optical sensor receives the optical signal through the code disk. Each optical sensor converts the optical signal into a voltage signal and outputs the voltage signal. The encoding circuit receives and normalizes the voltage signals to generate (K+1) voltage values. During a period in which the code disk rotates by a distance of 2W/K, the encoding circuit compares the voltage values with a preset value to generate at least two binary codes. When K is odd, the preset value is 0.5, and when K is even, the preset value is 0.55. The present invention can increase an absolute row resolution of the code disc.

10 Claims, 3 Drawing Sheets

OPTICAL ENCODING DEVICE FOR DIGITAL SIGNAL PROCESSING

This application claims priority for Taiwan patent application no. 107139014 filed on Nov. 2, 2018, the content of which is incorporated by reference in its entirely.

BACKGROUND OF THE INVENTION

1. Field of the Invention

The present invention relates to an encoding device, and more particular to an optical encoding device.

2. Description of the Related Art

In the conventional electronic devices and mechanical devices, an optical encoder is usually added in a driving component, such as a motor, to accurately obtain information of rotation and movement of an internal component. The conventional optical encoder includes an optical structure, a light source, and an optical sensor. In general, the optical structure has a plurality of regions for passing light. When the optical structure rotates, the optical sensor receives an optical signal with a specific periodicity. The optical encoder can determine the displacement, angular displacement and rotational speed of the object driven by the driving component according to the optical signal.

Please refer to FIG. 1, which is a schematic diagram of a conventional linear encoder. The linear encoder comprises a light source 10, a code disc 12, a lens element 14, a target lens element 16 and an optical sensor 18. The code disc 12 has a lattice pattern including light-transmitting regions and non-light-transmitting regions alternately arranged. The light source 10 emits light which is directed toward the code disc 12 after being refracted by the lens element 14 into parallel light. The light passing through the code disc 12 can form an image to represent the lattice pattern that passes through the target lens element 16 and is sensed by the optical sensor 18. The optical sensor 18 includes a plurality of photocells disposed in parallel to the code disc 12 and configured to output electric signals, and each electric signal has an amplitude corresponding to the intensity of the light emitting to the photocell. When demand for alignment between components in the current technology increases, the density of the periodic regions of the code disc of the existing optical encoder is also increased. However, in order to effectively analyze the optical signals formed by these periodic regions, the density and alignment precision of these sensing devices are also increased. However, the sensing devices with high density and high alignment precision also increases the manufacturing cost and difficulty, and it also limits the highest positioning resolution that the optical encoder can determine.

For this reason, the present invention provides an optical encoding device to solve the above-mentioned problems.

SUMMARY OF THE INVENTION

An objective of the present invention is to provide an optical encoding device in which a plurality of K gratings and a plurality of (K+1) optical sensors are arranged in the same total widths, and the optical encoding device uses a preset value to perform a digital processing on voltage signals generated by the plurality of optical sensors, so as to improve an absolute row resolution of a code disc.

In order to achieve the objective, the present invention provides an optical encoding device comprising a code disc, an optical signal generator, (K+1) optical sensors, and an encoding circuit. The code disc includes a plurality of K gratings arranged in a row. K is higher than and equal to 3. Each grating can be a light-transmitting region or a non-light-transmitting region. The plurality of gratings comprises light-transmitting regions and non-light-transmitting regions alternately arranged. The plurality of gratings have the same sizes, and the code disc comprises a first side and a second side opposite to each other. The optical signal generator is disposed on the first side, and configured to emit an optical signal toward the plurality of gratings. The (K+1) optical sensors are disposed on the second side, and corresponding in position to the plurality of gratings, respectively. The (K+1) optical sensors have the same sizes, and a total width of the (K+1) optical sensors is equal to a total width of the K gratings, the total width of the K gratings is equal to W, the (K+1) optical sensors receive the optical signal through the light-transmitting regions of the code disc, and each of the (K+1) optical sensors can convert the optical signal into a voltage signal and outputs the voltage signal. The voltage signal is proportional to intensity of the received optical signal corresponding thereto. The encoding circuit is electrically connected to the (K+1) optical sensors, and configured to receive the voltage signals outputted from the (K+1) optical sensors and normalize the received voltage signals to generate (K+1) voltage values. During a period in which the code disc rotates by a distance of 2W/K, the encoding circuit compares the voltage values with a preset value, and when K is odd, the preset value is 0.5, and when K is even, the preset value is 0.55, and when the voltage value is higher than the preset value, the encoding circuit converts the voltage values to a first digital value, and when the voltage value is lower than or equal to the preset value, the encoding circuit converts the voltage value into a second digital value different from the first digital value, and the encoding circuit generates at least two binary codes according to the first digital values and the second digital values corresponding to the (K+1) voltage values, respectively.

In an embodiment, the encoding circuit comprises a normalization processing unit, (K+1) comparators, a logic combination circuit, and a binary encoder. The normalization processing unit is electrically connected to the (K+1) optical sensors, and configured to receive the voltage signals outputted from the (K+1) optical sensors and normalize the voltage signals to generate the (K+1) voltage values. The (K+1) comparators are electrically connected to the normalization processing unit, and configured to receive the (K+1) voltage values corresponding to the (K+1) optical sensors, respectively. During the period in which the code disc rotates by a distance of 2W/K, the comparators compare the (K+1) voltage values with the preset value, to convert the (K+1) voltage values into the first digital values and the second digital values. The logic combination circuit is electrically connected to the comparator, and configured to receive the first digital values and the second digital values corresponding to the voltage values, respectively. During the period in which the code disc rotates by a distance of 2W/K, the logic combination circuit generates digital signals corresponding to (K+1) different positions or 2K different positions, according to the first digital values and the second digital values corresponding to the voltage values. When K is odd, the digital signals correspond to the 2K different positions, and when K is even, the digital signals correspond to (K+1) different positions. The binary encoder is electrically connected to the logic combination circuit, and configured to receive the digital signals and generate the binary codes according to the digital signals.

In an embodiment, when K is odd, the logic combination circuit comprises K XOR gates, and output terminals of the K XOR gates are electrically connected to the binary encoder, and the two comparators corresponding to two adjacent optical sensors are electrically connected to two input terminals of one of the K XOR gates, respectively, and the K XOR gates receive the first digital values and the second digital values corresponding to the voltage values. During the period in which the code disc rotates by a distance of 2W/K, the XOR gates generates the digital signals corresponding to the 2K different positions, according to the first digital values and the second digital values corresponding to the voltage values.

In an embodiment, when K is even, the logic combination circuit comprises (K+1) XOR gates, and output terminals of the (K+1) XOR gates are electrically connected to the binary encoder, and the two comparators corresponding to two adjacent optical sensors are electrically connected to two input terminals of one of the (K+1) XOR gates, respectively, and the two comparators corresponding to the first optical sensor and the last optical sensor are electrically connected to two input terminal of one of the (K+1) XOR gate, respectively, and the (K+1) XOR gates receive the first digital values and the second digital values corresponding to the voltage values, and during the period in which the code disc rotates by a distance of 2W/K, the (K+1) XOR gates generates the digital signals corresponding to the (K+1) different positions according to the first digital values and the second digital values corresponding to the voltage values.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
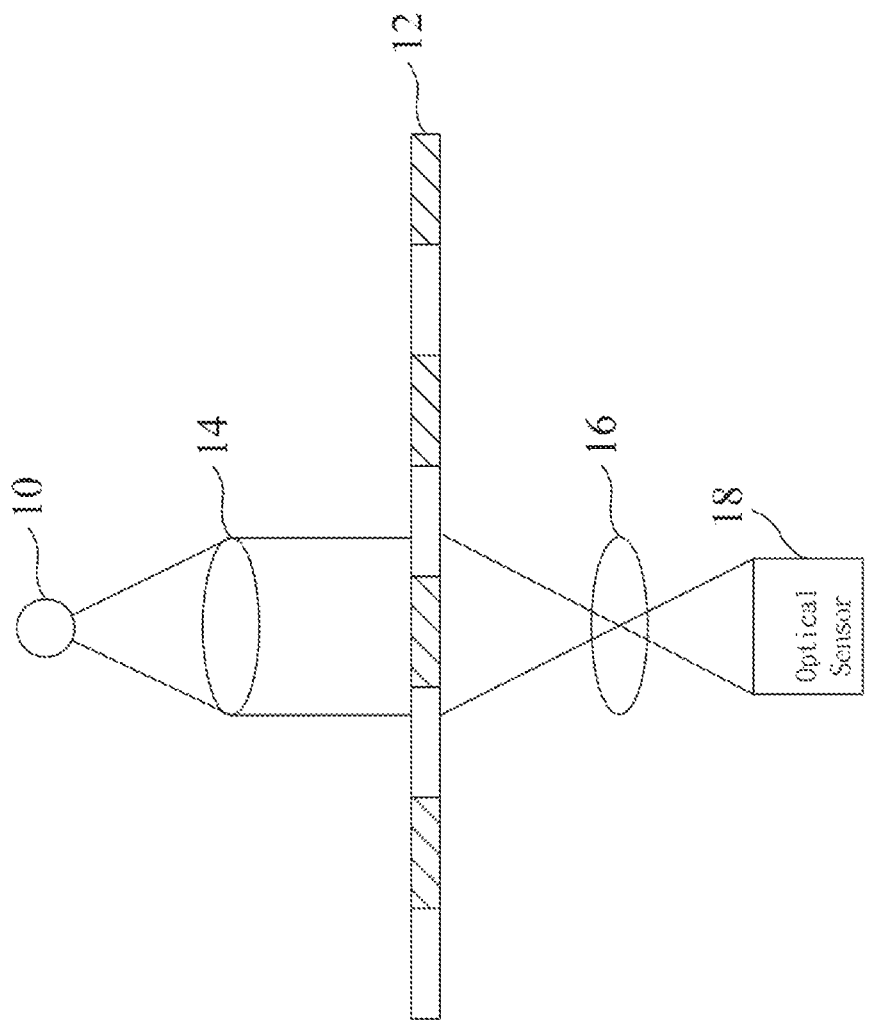
FIG. 1 is a schematic view of a conventional linear encoder.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

Figure 2:
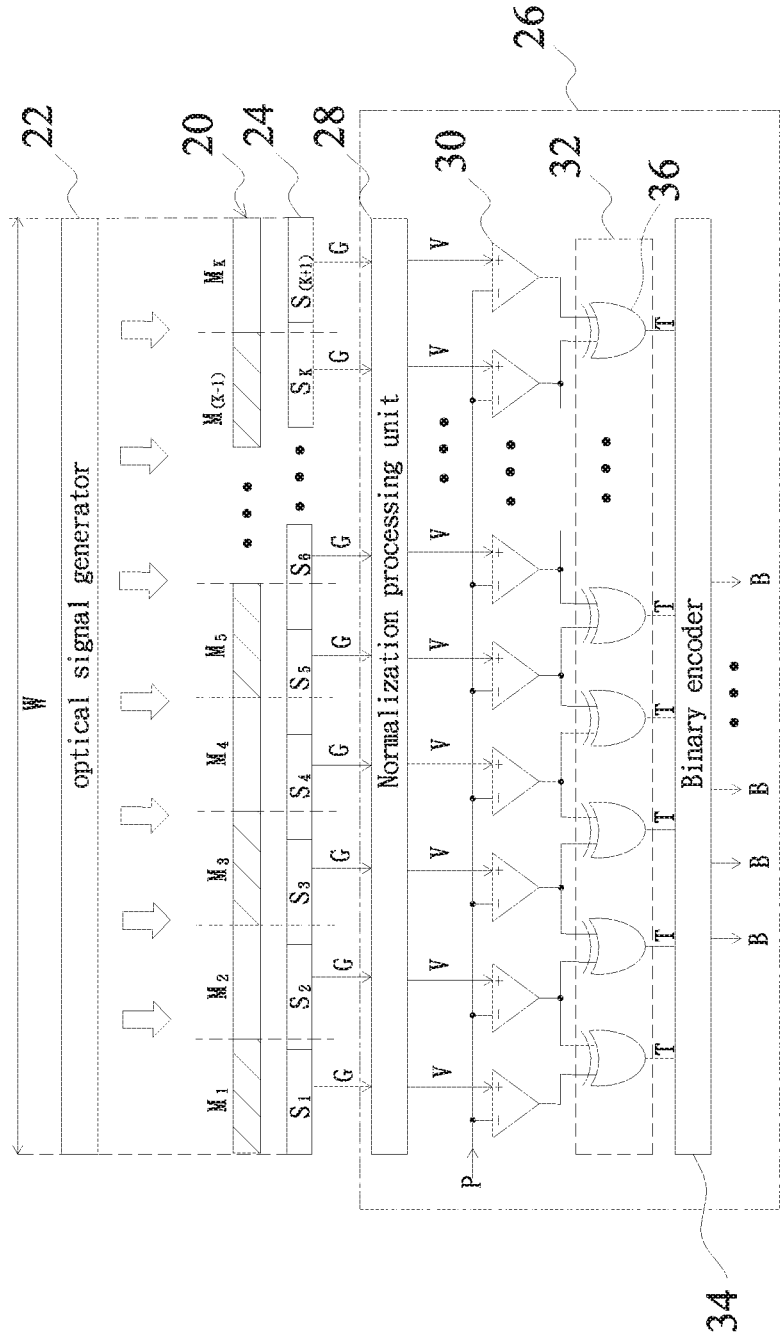
FIG. 2 is a schematic view of a first embodiment of an optical encoding device of the present invention.

Please refer to FIG. 2. In a first embodiment of the present invention, an optical encoding device includes a code disc 20, an optical signal generator 22, (K+1) optical sensors 24 and an encoding circuit 26. All optical sensors 24 are labelled as $S_1, S_2, S_3, \ldots$ and $S_{(K+1)}$, respectively. In an embodiment, the code disc 20 can be a linear code disc or a rotary code disc, and the optical sensor 24 can be a photodiode; however, the present invention is not limited thereto. The code disc 20 can include K gratings $M_1, M_2, M_3, \ldots$ and $M_K$ arranged in a row, and K is higher than and equal to 3. Each of the gratings $M_1, M_2, M_3, \ldots$ and $M_K$ can be a light-transmitting region or a non-light-transmitting region. As shown in FIG. 2, the light-transmitting region is shown by a blank block and the non-light-transmitting region is shown by a section-line block. The gratings $M_1, M_2, M_3, \ldots$ and $M_K$ can include light-transmitting regions and non-light-transmitting regions alternately arranged, and the gratings $M_1, M_2, M_3, \ldots$ and $M_K$ have the same sizes. The code disc 20 has a first side and a second side opposite to each other. The optical signal generator 22 is disposed the first side and emits an optical signal toward the gratings $M_1, M_2, M_3, \ldots,$ and $M_K$. All optical sensors $S_1, S_2, S_3, \ldots,$ and $S_{(K+1)}$ are disposed on the second side and correspond in position to the all gratings $M_1, M_2, M_3, \ldots,$ and $M_K$, respectively. The plurality of optical sensors $S_1, S_2, S_3, \ldots,$ and $S_{(K+1)}$ have the same sizes, and a total width of $S_1, S_2, S_3, \ldots,$ and $S_{(K+1)}$ is equal to a total width of the gratings $M_1, M_2, M_3, \ldots,$ and $M_K$. The total width of the gratings $M_1, M_2, M_3, \ldots,$ and $M_K$ is equal to W. Each optical sensor 24 has a width of W/(K+1), and each grating has a width of W/K. The grating space corresponding to each optical sensor $S_x$ can meet an equation (1) below, $$S_{X+1} = \frac{X}{K+1} \times M_X + \frac{K-X}{K+1} \times M_{X+1} \qquad \text{equation (1)}$$

wherein X=1 . . . K.

The grating space corresponding to the optical sensor $S_{(K+1)}$ is $$M_K \times \frac{K}{K+1}.$$

In a first embodiment, K is odd for exemplary illustration. All optical sensors $S_1$, $S_2$, $S_3$, . . . , and $S_{(K+1)}$ receive the optical signal through the light-transmitting regions of the code disc 20. Each of the optical sensors $S_1$, $S_2$, $S_3$, . . . , and $S_{(K+1)}$ can convert the optical signal into a voltage signal G which is proportional to the intensity of received optical signal corresponding thereto, and then output the voltage signal G. The encoding circuit 26 is electrically connected to the optical sensors $S_1$, $S_2$, $S_3$, . . . , and $S_{(K+1)}$, and configured to receive the voltage signals G outputted from $S_1$, $S_2$, $S_3$, . . . , and $S_{(K+1)}$, and normalize the received voltage signals G, so as to generate (K+1) voltage values V. During a period in which the code disc 20 rotates by a distance of 2W/K in the same direction, the encoding circuit 26 can compare the voltage values V with a preset value P. When K is odd, the preset value P is set as 0.5. When the voltage value V is higher than the preset value P, the encoding circuit 26 converts the voltage value V into a first digital value D1. When the voltage value V is lower than or equal to the preset value P, the encoding circuit 26 converts the voltage value V into a second digital value D2 which is different from the first digital value D1. For example, the first digital value D1 can be 1 and the second digital value D2 can be 0. The encoding circuit 26 generates at least two binary codes B according to the first digital values D1 and the second digital values D2 corresponding to the plurality of voltage values V. When K is odd, a number of the binary codes B is a minimal integer higher than $[1+ \log_2(K+1)]$.

The encoding circuit 26 includes a normalization processing unit 28, (K+1) comparators 30, a logic combination circuit 32 and a binary encoder 34. The normalization processing unit 28 is electrically connected to all optical sensors 24 and configured to receive the voltage signals G outputted from all optical sensors 24 and normalize the received voltage signals, so as to generate the voltage values V. All comparators 30 are electrically connected to the normalization processing unit 28 and configured to receive the voltage values V corresponding to all optical sensors 24. During the period in which the code disc rotates by a distance of 2W/K, all comparators 30 can compare voltage values V with the preset value P, to convert the voltage values V into the first digital values D1 and the second digital values D2, respectively. The logic combination circuit 32 is electrically connected to the comparators 30 and configured to receive the first digital values D1 and the second digital values D2 corresponding to the voltage values V. During the period in which the code disc rotates by a distance of 2W/K, the logic combination circuit 32 can generate digital signals T corresponding to 2K different positions, according to the first digital values D1 and the second digital values D2 corresponding to the all voltage values. The binary encoder 34 is electrically connected to the logic combination circuit 32 and configured to receive the digital signals T and generate the binary codes B according to the digital signals T.

When K is odd, the logic combination circuit 32 can comprise K XOR gates 36, and the output terminals of the K XOR gates are electrically connected to the binary encoder 34, and two comparators 30 corresponding to two adjacent two optical sensors 24 are electrically connected to two input terminals of one of all XOR gates 36, respectively. All XOR gates 36 receive the first digital values D1 and the second digital values D2 corresponding to the voltage values V. During the period in which the code disc rotates by a distance of 2W/K, all XOR gates 36 can generate the digital signals T corresponding to the 2K different positions, according to the first digital values D1 and the second digital values D2 corresponding to the voltage values V.

The operation of the first embodiment of the optical encoding device of the present invention will be described in the following paragraphs. First, during the period in which the code disc rotates by a distance of 2W/K, all optical sensors $S_1$, $S_2$, $S_3$, . . . , and $S_{(K+1)}$ receive the optical signal through the light-transmitting regions of the code disc 20, and each of the optical sensors $S_1$, $S_2$, $S_3$, . . . , and $S_{(K+1)}$ converts the optical signal into the voltage signal G which is proportional to the intensity of the received optical signal corresponding thereto, and outputs the voltage signal G. Next, the normalization processing unit 28 receives the voltage signals G outputted from all optical sensors 24, and normalizes the received voltage signals to generate the voltage values V.

In a condition that K is 11, the voltage values V corresponding to all optical sensors 24 are shown in a table one below.

TABLE ONE

| $S_1$ | $S_2$ | $S_3$ | $S_4$ | $S_5$ | $S_6$ |
|---|---|---|---|---|---|
| 0 | 0.909091 | 0.181818 | 0.727273 | 0.363636 | 0.545455 |
| 0.090909 | 0.818182 | 0.272727 | 0.636354 | 0.454545 | 0.454545 |
| 0.181818 | 0.727273 | 0.363636 | 0.545455 | 0.545455 | 0.363636 |
| 0.272727 | 0.636364 | 0.454545 | 0.454545 | 0.636364 | 0.272727 |
| 0.363636 | 0.545455 | 0.545455 | 0.363636 | 0.727273 | 0.181818 |
| 0.454545 | 0.454545 | 0.636364 | 0.272727 | 0.818182 | 0.090909 |
| 0.545455 | 0.363636 | 0.727273 | 0.181818 | 0.909091 | 0 |
| 0.636364 | 0.272727 | 0.818182 | 0.090909 | 1 | 0 |
| 0.727273 | 0.181818 | 0.909091 | 0 | 1 | 0.090909 |
| 0.818182 | 0.090909 | 1 | 0 | 0.909091 | 0.181818 |
| 0.909091 | 0 | 1 | 0.090909 | 0.818182 | 0.272727 |
| 1 | 0 | 0.909091 | 0.181818 | 0.727273 | 0.363636 |
| 1 | 0.090909 | 0.818182 | 0.272727 | 0.636364 | 0.454545 |
| 0.909091 | 0.181818 | 0.727273 | 0.363636 | 0.545455 | 0.545455 |
| 0.818182 | 0.272727 | 0.636364 | 0.454545 | 0.454545 | 0.636364 |
| 0.727273 | 0.363636 | 0.545455 | 0.545455 | 0.363636 | 0.727273 |
| 0.636364 | 0.454545 | 0.454545 | 0.636364 | 0.272727 | 0.818182 |
| 0.545455 | 0.545455 | 0.363636 | 0.727273 | 0.181818 | 0.909091 |
| 0.454545 | 0.636364 | 0.272727 | 0.818182 | 0.090909 | 1 |
| 0.363636 | 0.727273 | 0.181818 | 0.909091 | 0 | 1 |
| 0.272727 | 0.818182 | 0.090909 | 1 | 0 | 0.909091 |
| 0.181818 | 0.909091 | 0 | 1 | 0.090909 | 0.818182 |
| 0.090909 | 1 | 0 | 0.909091 | 0.181818 | 0.727273 |
| 0 | 1 | 0.090909 | 0.818182 | 0.272727 | 0.636364 |

| $S_7$ | $S_8$ | $S_9$ | $S_{10}$ | $S_{11}$ | $S_{12}$ |
|---|---|---|---|---|---|
| 0.545455 | 0.363636 | 0.727273 | 0.181818 | 0.909091 | 0 |
| 0.636364 | 0.272727 | 0.818182 | 0.090909 | 1 | 0 |
| 0.727273 | 0.181818 | 0.909091 | 0 | 1 | 0.090909 |
| 0.818182 | 0.090909 | 1 | 0 | 0.909091 | 0.181818 |
| 0.909091 | 0 | 1 | 0.090909 | 0.818182 | 0.272727 |
| 1 | 0 | 0.909091 | 0.181818 | 0.727273 | 0.363636 |
| 1 | 0.090909 | 0.818182 | 0.272727 | 0.636364 | 0.454545 |
| 0.909091 | 0.181818 | 0.727273 | 0.363636 | 0.545455 | 0.545455 |
| 0.818182 | 0.272727 | 0.636364 | 0.454545 | 0.454545 | 0.636364 |
| 0.727273 | 0.363636 | 0.545455 | 0.545455 | 0.363636 | 0.727273 |
| 0.636364 | 0.454545 | 0.454545 | 0.636364 | 0.272727 | 0.818182 |
| 0.545455 | 0.545455 | 0.363636 | 0.727273 | 0.181818 | 0.909091 |
| 0.454545 | 0.636364 | 0.272727 | 0.818182 | 0.090909 | 1 |
| 0.363636 | 0.727273 | 0.181818 | 0.909091 | 0 | 1 |
| 0.272727 | 0.818182 | 0.090909 | 1 | 0 | 0.909091 |
| 0.181818 | 0.909091 | 0 | 1 | 0.090909 | 0.818182 |
| 0.090909 | 1 | 0 | 0.909091 | 0.181818 | 0.727273 |
| 0 | 1 | 0.090909 | 0.818182 | 0.272727 | 0.636364 |
| 0 | 0.909091 | 0.181818 | 0.727273 | 0.363636 | 0.545455 |
| 0.090909 | 0.818182 | 0.272727 | 0.636364 | 0.454545 | 0.454545 |
| 0.181818 | 0.727273 | 0.363636 | 0.545455 | 0.545455 | 0.363636 |
| 0.272727 | 0.636364 | 0.454545 | 0.454545 | 0.636364 | 0.272727 |
| 0.363636 | 0.545455 | 0.545455 | 0.363636 | 0.727273 | 0.181818 |
| 0.454545 | 0.454545 | 0.636364 | 0.272727 | 0.818182 | 0.090909 |

In the table one, the data of the first row indicates the voltage values V corresponding to all optical sensors 24 when the code disc 20 at an original point, the data of the second row indicates the voltage values V corresponding to all optical sensors 24 after the code disc 20 rotates by W/[K×(K+1)] from the original point in the same direction. and so on; the data of the twenty-fourth row indicates the voltage values V corresponding to all optical sensors 24 after the code disc 20 rotates by 23× W/[K×(K+1)] from the original point in the same direction. Next, all comparators 30 can compare voltage values V with the preset value P, respectively, so as to convert the voltage values V into the first digital values D1 and the second digital values D2, respectively. As a result, the data of the table one can be converted into the data shown in a table two below.

TABLE TWO

| $S_1$ | $S_2$ | $S_3$ | $S_4$ | $S_5$ | $S_6$ | $S_7$ | $S_8$ | $S_9$ | $S_{10}$ | $S_{11}$ | $S_{12}$ |
|---|---|---|---|---|---|---|---|---|---|---|---|
| 0 | 1 | 0 | 1 | 0 | 1 | 1 | 0 | 1 | 0 | 1 | 0 |
| 0 | 1 | 0 | 1 | 0 | 0 | 1 | 0 | 1 | 0 | 1 | 0 |
| 0 | 1 | 0 | 1 | 1 | 0 | 1 | 0 | 1 | 0 | 1 | 0 |
| 0 | 1 | 0 | 0 | 1 | 0 | 1 | 0 | 1 | 0 | 1 | 0 |
| 0 | 1 | 1 | 0 | 1 | 0 | 1 | 0 | 1 | 0 | 1 | 0 |
| 0 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 1 |
| 1 | 0 | 1 | 0 | 1 | 0 | 1 | 0 | 1 | 0 | 0 | 1 |
| 1 | 0 | 1 | 0 | 1 | 0 | 1 | 0 | 1 | 1 | 0 | 1 |
| 1 | 0 | 1 | 0 | 1 | 0 | 1 | 0 | 0 | 1 | 0 | 1 |
| 1 | 0 | 1 | 0 | 1 | 0 | 1 | 1 | 0 | 1 | 0 | 1 |
| 1 | 0 | 1 | 0 | 1 | 0 | 0 | 1 | 0 | 1 | 0 | 1 |
| 1 | 0 | 1 | 0 | 1 | 1 | 0 | 1 | 0 | 1 | 0 | 1 |
| 1 | 0 | 1 | 0 | 0 | 1 | 0 | 1 | 0 | 1 | 0 | 1 |
| 1 | 0 | 1 | 1 | 0 | 1 | 0 | 1 | 0 | 1 | 0 | 1 |
| 1 | 0 | 0 | 1 | 0 | 1 | 0 | 1 | 0 | 1 | 0 | 1 |
| 1 | 1 | 0 | 1 | 0 | 1 | 0 | 1 | 0 | 1 | 0 | 1 |
| 0 | 1 | 0 | 1 | 0 | 1 | 0 | 1 | 0 | 1 | 0 | 1 |
| 0 | 1 | 0 | 1 | 0 | 1 | 0 | 1 | 0 | 1 | 0 | 0 |
| 0 | 1 | 0 | 1 | 0 | 1 | 0 | 1 | 0 | 1 | 1 | 0 |
| 0 | 1 | 0 | 1 | 0 | 1 | 0 | 1 | 0 | 0 | 1 | 0 |
| 0 | 1 | 0 | 1 | 0 | 1 | 0 | 1 | 1 | 0 | 1 | 0 |
| 0 | 1 | 0 | 1 | 0 | 1 | 0 | 0 | 1 | 0 | 1 | 0 |

In the table two, repeated two digital values "1" are defined as first repeated blocks, and repeated two digital values "0" are defined as second repeated blocks. As shown in the table two, the first repeated blocks occur at the positions, corresponding to the optical sensors $S_6$ and $S_7$, in the first row; the positions, corresponding to the optical sensors $S_4$ and $S_5$, in the third row; the positions, corresponding to the optical sensors $S_2$ and $S_3$, in the fifth row; the positions, corresponding to the optical sensors $S_{11}$ and $S_{12}$, in the eighth row; the positions, corresponding to the optical sensors $S_9$ and $S_{10}$, in the tenth row; the positions, corresponding to the optical sensors $S_7$ and $S_8$, in the eleventh row; the positions, corresponding to the optical sensors $S_5$ and $S_6$, in the thirteenth row; the positions, corresponding to the optical sensors $S_3$ and $S_4$, in the fifteenth row; the positions, corresponding to the optical sensors $S_1$ and $S_2$, in the seventeenth row; the positions, corresponding to the optical sensors $S_{10}$ and $S_{11}$, in the twenty-first row; and the positions, corresponding to the optical sensors $S_8$ and $S_9$, in the twenty-third row. The second repeated blocks occur at the positions, corresponding to the optical sensors $S_5$ and $S_6$, in the second row; the positions, corresponding to the optical sensors $S_3$ and $S_4$, in the fourth row; the positions, corresponding to the optical sensors $S_1$ and $S_2$, in the sixth row; the positions, corresponding to the optical sensors $S_{10}$ and $S_{11}$, in the ninth row; the positions, corresponding to the optical sensors $S_8$ and $S_9$, in the eleventh row; the positions, corresponding to the optical sensors $S_6$ and $S_7$, in the thirteenth row; the positions, corresponding to the optical sensors $S_4$ and $S_5$, in the fifteenth row; the positions, corresponding to the optical sensors $S_2$ and $S_3$, in the seventeenth row; the positions, corresponding to the optical sensors $S_{11}$ and $S_{12}$, in the twentieth row; the positions, corresponding to the optical sensors $S_9$ and $S_{10}$, in the twenty-second row; and the positions, corresponding to the optical sensors $S_7$ and $S_8$, in the twenty-fourth row. In the other words, during the period in which the code disc rotates by a distance of 2W/K, the distance of 2W/K can be divided into 2 (K+1) positions. The first embodiment can increase an absolute row resolution of the code disc 20, and a number of increased bits of the resolution is $\log_2 [2(K+1)]$.

Next, all XOR gates 36 can receive the first digital values D1 and the second digital values D2 corresponding to the voltage values V, and generate the digital signals T corresponding to the 2K different positions, according to the first digital values D1 and the second digital values D2 corresponding to the voltage values V.

A table three shows the first digital values D1 and second digital values D2 corresponding to the optical sensors 24 during the period in which the code disc 20 rotates by a distance of 2W/K, in a condition that K is 5.

TABLE THREE

| $S_1$ | $S_2$ | $S_3$ | $S_4$ | $S_5$ | $S_6$ |
|---|---|---|---|---|---|
| 1 | 0 | 1 | 1 | 0 | 1 |
| 1 | 0 | 1 | 0 | 0 | 1 |
| 1 | 0 | 1 | 0 | 1 | 1 |
| 1 | 0 | 1 | 0 | 1 | 0 |
| 0 | 0 | 1 | 0 | 1 | 0 |
| 0 | 1 | 1 | 0 | 1 | 0 |
| 0 | 1 | 0 | 0 | 1 | 0 |
| 0 | 1 | 0 | 1 | 1 | 0 |
| 0 | 1 | 0 | 1 | 0 | 0 |
| 0 | 1 | 0 | 1 | 0 | 1 |
| 1 | 1 | 0 | 1 | 0 | 1 |
| 1 | 0 | 0 | 1 | 0 | 1 |

AS, BS, CS, DS and ES are used to indicate the signals generated by the five XOR gates 36 using the first digital values D1 and second digital values D2 corresponding to the voltage values V, respectively. AS corresponds to the optical sensors $S_1$ and $S_2$, BS corresponds to the optical sensors $S_2$ and $S_3$, CS corresponds to the optical sensors $S_3$ and $S_4$, DS corresponds to the optical sensors $S_4$ and $S_5$, and ES corresponds to the optical sensors $S_5$ and $S_6$. Table four shows values of the signals AS, BS, CS, DS and ES during the period in which the code disc rotates by a distance of 2W/K. The table four records the digital signals T at twelve positions.

TABLE FOUR

| AS | BS | CS | DS | ES |
|---|---|---|---|---|
| 1 | 1 | 0 | 1 | 1 |
| 1 | 1 | 1 | 0 | 1 |
| 1 | 1 | 1 | 1 | 0 |
| 1 | 1 | 1 | 1 | 1 |
| 0 | 1 | 1 | 1 | 1 |
| 1 | 0 | 1 | 1 | 1 |
| 1 | 1 | 0 | 1 | 1 |
| 1 | 1 | 1 | 0 | 1 |
| 1 | 1 | 1 | 1 | 0 |
| 1 | 1 | 1 | 1 | 1 |
| 0 | 1 | 1 | 1 | 1 |
| 1 | 0 | 1 | 1 | 1 |

Next, the binary encoder 34 receives the digital signals T and generates the binary codes B according to the digital signals T. Table five shows the decimal codes converted from three binary codes B.

TABLE FIVE

| S₁ | B | B | B | Decimal code |
|---|---|---|---|---|
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 1 | 0 | 0 | 1 | 9 |
| 1 | 0 | 1 | 0 | 10 |

A user can find the positions of the optical sensors 24 corresponding to each decimal code, according to Table six. Each decimal code indicates two positions.

TABLE SIX

| Decimal code | 1 | 2 | ... | K − 1 | K |
|---|---|---|---|---|---|
| Decoded positions | $S_1$ and $S_2$ | $S_2$ and $S_3$ | ... | $S_{(K-1)}$ and $S_K$ | $S_K$ and $S_{(K+1)}$ |

Figure 3:
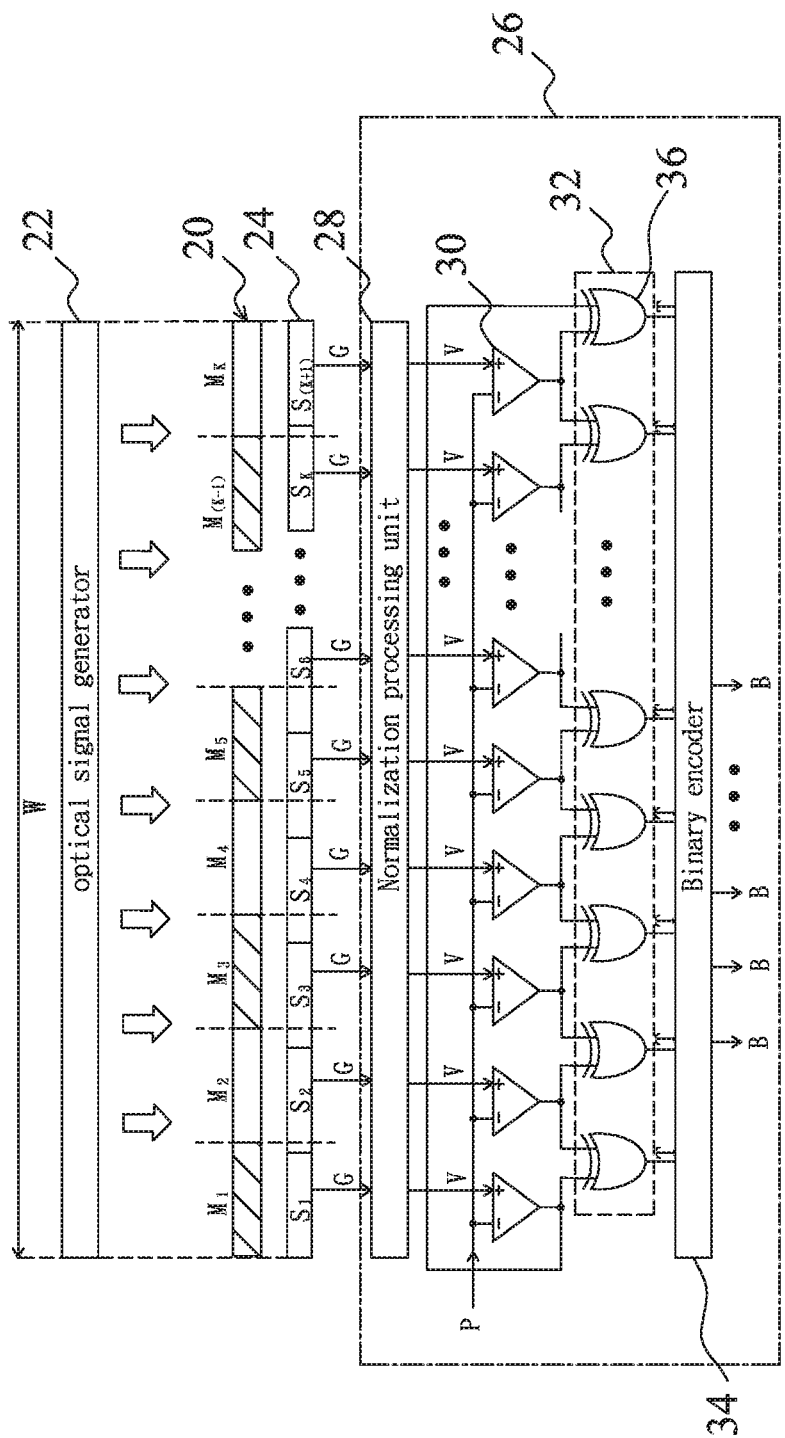
FIG. 3 is a schematic view of a second embodiment of an optical encoding device of the present invention.

Please refer to FIG. 3. The difference between the first embodiment and the second embodiment of the optical encoding device of the present invention is the logic combination circuit 32, K, the preset value P, the number of binary codes B, and the digital signals T. In the second embodiment, K is even, the preset value P is 0.55, the number of binary codes B is a minimal integer higher than $\log_2(K+1)$, and the logic combination circuit 32 comprises the (K+1) XOR gates 36, and the output terminals of the (K+1) XOR gates are electrically connected to the binary encoder 34. Two comparators 30 corresponding to two adjacent optical sensors 24 are electrically connected to two input terminals of one of the XOR gates 36, respectively. The two comparators 30 corresponding to the first optical sensor 24 and last optical sensor 24 are electrically connected two input terminals of one of XOR gates 36, respectively. All XOR gates 36 receive the first digital values D1 and the second digital values D2 corresponding to the voltage values V. During the period in which the code disc rotates by a distance of 2W/K, all XOR gates 36 can generate the digital signals T corresponding to (K+1) different positions, according to the first digital values D1 and the second digital values D2 corresponding to the all voltage values V.

The operation of the second embodiment of the optical encoding device of the present invention is described in the following paragraphs. First, during the period in which the code disc rotates by a distance of 2W/K, all optical sensors $S_1, S_2, S_3, \ldots,$ and $S_{(K+1)}$ receive the optical signal through the light-transmitting regions of the code disc 20, the each of the optical sensors $S_1, S_2, S_3, \ldots,$ and $S_{(K+1)}$ converts the optical signal into a voltage signal G which is proportional to the intensity of the received optical signal corresponding thereto, and outputs the voltage signal G. Next, the normalization processing unit 28 receives the voltage signals G outputted from the optical sensors 24, and normalizes the received voltage signals G to generate the voltage values V. Table seven shows the voltage values V corresponding to all optical sensors 24, in a condition that K is 10.

TABLE SEVEN

| S₁ | S₂ | S₃ | S₄ | S₅ | S₆ | S₇ | S₈ | S₉ | S₁₀ | S₁₁ |
|---|---|---|---|---|---|---|---|---|---|---|
| 0 | 0.9 | 0.2 | 0.7 | 0.4 | 0.5 | 0.6 | 0.3 | 0.8 | 0.1 | 1 |
| 0.1 | 0.8 | 0.3 | 0.6 | 0.5 | 0.4 | 0.7 | 0.2 | 0.9 | 0 | 1 |
| 0.2 | 0.7 | 0.4 | 0.5 | 0.6 | 0.3 | 0.8 | 0.1 | 1 | 0 | 0.9 |
| 0.3 | 0.6 | 0.5 | 0.4 | 0.7 | 0.2 | 0.9 | 0 | 1 | 0.1 | 0.8 |
| 0.4 | 0.5 | 0.6 | 0.3 | 0.8 | 0.1 | 1 | 0 | 0.9 | 0.2 | 0.7 |
| 0.5 | 0.4 | 0.7 | 0.2 | 0.9 | 0 | 1 | 0.1 | 0.8 | 0.3 | 0.6 |
| 0.6 | 0.3 | 0.8 | 0.1 | 1 | 0 | 0.9 | 0.2 | 0.7 | 0.4 | 0.5 |
| 0.7 | 0.2 | 0.9 | 0 | 1 | 0.1 | 0.8 | 0.3 | 0.6 | 0.5 | 0.4 |
| 0.8 | 0.1 | 1 | 0 | 0.9 | 0.2 | 0.7 | 0.4 | 0.5 | 0.6 | 0.3 |
| 0.9 | 0 | 1 | 0.1 | 0.8 | 0.3 | 0.6 | 0.5 | 0.4 | 0.7 | 0.2 |
| 1 | 0 | 0.9 | 0.2 | 0.7 | 0.4 | 0.5 | 0.6 | 0.3 | 0.8 | 0.1 |
| 1 | 0.1 | 0.8 | 0.3 | 0.6 | 0.5 | 0.4 | 0.7 | 0.2 | 0.9 | 0 |
| 0.9 | 0.2 | 0.7 | 0.4 | 0.5 | 0.6 | 0.3 | 0.8 | 0.1 | 1 | 0 |
| 0.8 | 0.3 | 0.6 | 0.5 | 0.4 | 0.7 | 0.2 | 0.9 | 0 | 1 | 0.1 |
| 0.7 | 0.4 | 0.5 | 0.6 | 0.3 | 0.8 | 0.1 | 1 | 0 | 0.9 | 0.2 |
| 0.6 | 0.5 | 0.4 | 0.7 | 0.2 | 0.9 | 0 | 1 | 0.1 | 0.8 | 0.3 |
| 0.5 | 0.6 | 0.3 | 0.8 | 0.1 | 1 | 0 | 0.9 | 0.2 | 0.7 | 0.4 |
| 0.4 | 0.7 | 0.2 | 0.9 | 0 | 1 | 0.1 | 0.8 | 0.3 | 0.6 | 0.5 |
| 0.3 | 0.8 | 0.1 | 1 | 0 | 0.9 | 0.2 | 0.7 | 0.4 | 0.5 | 0.6 |
| 0.2 | 0.9 | 0 | 1 | 0.1 | 0.8 | 0.3 | 0.6 | 0.5 | 0.4 | 0.7 |
| 0.1 | 1 | 0 | 0.9 | 0.2 | 0.7 | 0.4 | 0.5 | 0.6 | 0.3 | 0.8 |
| 0 | 1 | 0.1 | 0.8 | 0.3 | 0.6 | 0.5 | 0.4 | 0.7 | 0.2 | 0.9 |

In the table seven, the data of the first row indicates voltage values V corresponding to optical sensors 24 when the code disc 20 at an original point, the data of the second row indicates the voltage values V corresponding to the optical sensors 24 after the code disc 20 rotates by W/[K×(K+1)] from the original point in the same direction, and so on; the data of the twenty-second row indicates the voltage values V corresponding to the optical sensors 24 after the code disc 20 rotates by 21× W/[K×(K+1)] from the original point in the same direction. All comparators 30 can compare voltage values V with the preset value P, to convert the voltage values V into the first digital values D1 and the second digital values D2. Table eight shows data converted from the data shown in the table seven.

TABLE EIGHT

| S₁ | S₂ | S₃ | S₄ | S₅ | S₆ | S₇ | S₈ | S₉ | S₁₀ | S₁₁ |
|---|---|---|---|---|---|---|---|---|---|---|
| 0 | 1 | 0 | 1 | 0 | 0 | 1 | 0 | 1 | 0 | 1 |
| 0 | 1 | 0 | 1 | 0 | 0 | 1 | 0 | 1 | 0 | 1 |
| 0 | 1 | 0 | 0 | 1 | 0 | 1 | 0 | 1 | 0 | 1 |
| 0 | 1 | 0 | 0 | 1 | 0 | 1 | 0 | 1 | 0 | 1 |
| 0 | 0 | 1 | 0 | 1 | 0 | 1 | 0 | 1 | 0 | 1 |
| 0 | 0 | 1 | 0 | 1 | 0 | 1 | 0 | 1 | 0 | 1 |
| 1 | 0 | 1 | 0 | 1 | 0 | 1 | 0 | 1 | 0 | 0 |
| 1 | 0 | 1 | 0 | 1 | 0 | 1 | 0 | 1 | 0 | 0 |
| 1 | 0 | 1 | 0 | 1 | 0 | 1 | 0 | 0 | 1 | 0 |
| 1 | 0 | 1 | 0 | 1 | 0 | 1 | 0 | 0 | 1 | 0 |
| 1 | 0 | 1 | 0 | 1 | 0 | 0 | 1 | 0 | 1 | 0 |
| 1 | 0 | 1 | 0 | 1 | 0 | 0 | 1 | 0 | 1 | 0 |
| 1 | 0 | 1 | 0 | 0 | 1 | 0 | 1 | 0 | 1 | 0 |
| 1 | 0 | 1 | 0 | 0 | 1 | 0 | 1 | 0 | 1 | 0 |
| 1 | 0 | 0 | 1 | 0 | 1 | 0 | 1 | 0 | 1 | 0 |
| 1 | 0 | 0 | 1 | 0 | 1 | 0 | 1 | 0 | 1 | 0 |
| 0 | 1 | 0 | 1 | 0 | 1 | 0 | 1 | 0 | 1 | 0 |
| 0 | 1 | 0 | 1 | 0 | 1 | 0 | 1 | 0 | 0 | 1 |
| 0 | 1 | 0 | 1 | 0 | 1 | 0 | 1 | 0 | 0 | 1 |
| 0 | 1 | 0 | 1 | 0 | 1 | 0 | 0 | 1 | 0 | 1 |
| 0 | 1 | 0 | 1 | 0 | 1 | 0 | 0 | 1 | 0 | 1 |

In the Table eight, the repeated two digital values "0" are defined as the repeated blocks, and the repeated blocks occur at the positions, corresponding to the optical sensors $S_5$ and $S_6$, in the first row; the positions, corresponding to the optical sensors $S_3$ and $S_4$, in the third row; the positions, corresponding to the optical sensors $S_1$ and $S_2$, in the fifth row; the positions, corresponding to the optical sensors $S_{10}$ and $S_{11}$, in the seventh row; the positions, corresponding to the optical sensors $S_8$ and $S_9$, in the ninth row; the positions, corresponding to the optical sensors $S_6$ and $S_7$, in the eleventh row; the positions, corresponding to the optical sensors $S_4$ and $S_5$, in the thirteenth row; the positions, corresponding to the optical sensors $S_2$ and $S_3$, in the fifteenth row; the positions, corresponding to the optical sensors $S_1$ and $S_{11}$, in the seventeenth row; the positions, corresponding to the optical sensors $S_9$ and $S_{10}$, in the nineteenth row; and the positions, corresponding to the optical sensors $S_7$ and $S_8$, in the twenty-first row. In the other words, during the period in which the code disc 20 rotates by a distance of 2W/K, the distance of 2W/K can be divided into (K+1) positions. The second embodiment can increase the absolute row resolution of the code disc 20, and the number of increased bits of the resolution is a minimal integer higher than $\log_2(K+1)$.

Furthermore, all XOR gates 36 can receive the first digital values D1 and the second digital values D2 corresponding to the voltage values V, and generate the digital signals T corresponding to the (K+1) different positions, according to the first digital values D1 and the second digital values D2 corresponding to the all voltage values V.

Table nine shows the first digital values D1 and second digital values D2 corresponding to all optical sensors 24 during the period in which the code disc 20 rotates by the length of 2W/K, in a condition that K is 4.

TABLE NINE

| $S_1$ | $S_2$ | $S_3$ | $S_4$ | $S_5$ |
|---|---|---|---|---|
| 1 | 0 | 1 | 1 | 0 |
| 1 | 0 | 1 | 1 | 0 |
| 1 | 0 | 1 | 0 | 1 |
| 1 | 0 | 1 | 0 | 1 |
| 0 | 1 | 1 | 0 | 1 |
| 0 | 1 | 1 | 0 | 1 |
| 0 | 1 | 0 | 1 | 1 |
| 0 | 1 | 0 | 1 | 1 |
| 1 | 1 | 0 | 1 | 0 |
| 1 | 1 | 0 | 1 | 0 |

AS, BS, CS, DS and ES are used to indicate the signals generated by the five XOR gates 36 using the first digital values D1 and second digital values D2 corresponding to the all voltage values V, respectively. AS corresponds to the optical sensors $S_1$ and $S_2$, BS corresponds to the optical sensors $S_2$ and $S_3$, CS corresponds to the optical sensors $S_3$ and $S_4$, DS corresponds to optical sensors $S_4$ and $S_5$, and ES corresponding to the optical sensors $S_5$ and $S_1$. The table ten shows the signals AS, BS, CS, DS and ES during the period in which the code disc rotates by a distance of 2W/K. The table ten can indicate the digital signals T at five positions.

TABLE TEN

| AS | BS | CS | DS | ES |
|---|---|---|---|---|
| 1 | 1 | 0 | 1 | 1 |
| 1 | 1 | 0 | 1 | 1 |
| 1 | 1 | 1 | 1 | 0 |
| 1 | 1 | 1 | 1 | 0 |
| 1 | 0 | 1 | 1 | 1 |
| 1 | 0 | 1 | 1 | 1 |
| 1 | 1 | 1 | 0 | 1 |
| 1 | 1 | 1 | 0 | 1 |
| 0 | 1 | 1 | 1 | 1 |
| 0 | 1 | 1 | 1 | 1 |

Next, the binary encoder 34 receives the digital signals T, and generates the binary codes B according to the digital signals T. Table eleven shows the decimal codes converted from all binary codes B.

TABLE ELEVEN

| B | B | B | Decimal code |
|---|---|---|---|
| 0 | 1 | 1 | 3 |
| 0 | 1 | 1 | 3 |
| 1 | 0 | 1 | 5 |
| 1 | 0 | 1 | 5 |
| 0 | 1 | 0 | 2 |
| 0 | 1 | 0 | 2 |
| 1 | 0 | 0 | 4 |
| 1 | 0 | 0 | 4 |
| 0 | 0 | 1 | 1 |
| 0 | 0 | 1 | 1 |

A user can find the positions of the optical sensors 24 corresponding to each decimal code, according to the Table twelve, and each decimal code corresponds to two positions.

TABLE TWELVE

| Decimal code | 1 | 2 | ... | K | K + 1 |
|---|---|---|---|---|---|
| Decoded positions | $S_1$ and $S_2$ | $S_2$ and $S_3$ | ... | $S_K$ and $S_{(K+1)}$ | $S_1$ and $S_{(K+1)}$ |

In summary, the K gratings and (K+1) optical sensors are arranged in the same widths, and the preset value is used to perform digital processing on the voltage signals generated by the optical sensors, so as to improve the absolute row resolution of the code disc.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An optical encoding device, comprising:
a code disc comprising a plurality of K gratings arranged in a row, wherein K is higher than and equal to 3, and each of the plurality of gratings is a light-transmitting region or a non-light-transmitting region, the plurality of gratings comprises light-transmitting regions and non-light-transmitting regions alternately arranged, and the plurality of gratings have the same sizes, and the code disc comprises a first side and a second side opposite to each other;
an optical signal generator disposed on the first side, and configured to emit an optical signal toward the plurality of gratings;
K+1 optical sensors disposed on the second side, and corresponding in position to the plurality of gratings, respectively, wherein the K+1 optical sensors have the same sizes, and a total width of the K+1 optical sensors is equal to a total width of the K gratings, the total width of the K gratings is equal to W, the K+1 optical sensors receive the optical signal through the light-transmitting regions of the code disc, and each of the K+1 optical sensors converts the optical signal into a voltage signal and outputs the voltage signal, wherein the voltage signal is proportional to intensity of the received optical signal corresponding thereto; and
an encoding circuit electrically connected to the K+1 optical sensors, and configured to receive the voltage signals outputted from the K+1 optical sensors and normalize the received voltage signals to generate K+1 voltage values, wherein during a period in which the code disc rotates by a distance of 2W/K, the encoding circuit compares the voltage values with a preset value, and when K is odd, the preset value is 0.5, and when K is even, the preset value is 0.55, and when the voltage value is higher than the preset value, the encoding circuit converts the voltage values to a first digital value, and when the voltage value is lower than or equal to the preset value, the encoding circuit converts the voltage value into a second digital value different from the first digital value, and the encoding circuit generates at least two binary codes according to the first digital values and the second digital values corresponding to the K+1 voltage values, respectively.

2. The optical encoding device according to claim 1, wherein the encoding circuit comprises:

a normalization processing unit electrically connected to the K+1 optical sensors, and configured to receive the voltage signals outputted from the K+1 optical sensors and normalize the voltage signals to generate the K+1 voltage values;

K+1 comparators electrically connected to the normalization processing unit, and configured to receive the K+1 voltage values corresponding to the K+1 optical sensors, respectively, and during the period in which the code disc rotates by a distance of 2W/K, the K+1 comparators compare the K+1 voltage values with the preset value, to convert the K+1 voltage values into the first digital values and the second digital values;

a logic combination circuit electrically connected to the comparator, and configured to receive the first digital values and the second digital values corresponding to the voltage values, respectively, and during the period in which the code disc rotates by a distance of 2W/K, the logic combination circuit generates digital signals corresponding to K+1 different positions or 2K different positions, according to the first digital values and the second digital values corresponding to the voltage values, and when K is odd, the digital signals correspond to the 2K different positions, when K is even, the digital signals correspond to K+1 different positions; and a binary encoder electrically connected to the logic combination circuit, and configured to receive the digital signals and generate the at least two binary codes according to the digital signals.

3. The optical encoding device according to claim 2, wherein when K is odd, the logic combination circuit comprises K XOR gates, and output terminals of the K XOR gates are electrically connected to the binary encoder, and the two comparators corresponding to two adjacent optical sensors are electrically connected to two input terminals of one of the K XOR gates, respectively, and the K XOR gates receive the first digital values and the second digital values corresponding to the voltage values, and during the period in which the code disc rotates by a distance of 2W/K, the XOR gates generates the digital signals corresponding to the 2K different positions, according to the first digital values and the second digital values corresponding to the K+1 voltage values.

4. The optical encoding device according to claim 2, wherein when K is even, the logic combination circuit comprises K+1 XOR gates, and output terminals of the K+1 XOR gates are electrically connected to the binary encoder, and the two comparators corresponding to two adjacent optical sensors are electrically connected to two input terminals of one of the K+1 XOR gates, respectively, and the two comparators corresponding to the first optical sensor and the last optical sensor are electrically connected to two input terminal of one of the K+1 XOR gates, respectively, and the K+1 XOR gates receive the first digital values and the second digital values corresponding to the voltage values, and during the period in which the code disc rotates by a distance of 2W/K, the K+1 XOR gates generates the digital signals corresponding to the K+1 different positions according to the first digital values and the second digital values corresponding to the K+1 voltage values.

5. The optical encoding device according to claim 2, wherein the first digital value is 1 and the second digital value is 0.

6. The optical encoding device according to claim 2, wherein the binary encoder is a combination of logic circuits.

7. The optical encoding device according to claim 1, wherein when K is even, a number of the at least two binary codes is a minimal integer higher than $\log_2(K+1)$.

8. The optical encoding device according to claim 1, wherein when K is odd, a number of the at least two binary codes is a minimal integer higher than $[1+ \log_2(K+1)]$.

9. The optical encoding device according to claim 1, wherein the code disc is a linear code disc or a rotary code disc.

10. The optical encoding device according to claim 1, wherein when one of the K+1 optical sensors is a photodiode.

* * * * *